United States Patent [19]

Cafarelli

[11] 4,246,917
[45] Jan. 27, 1981

[54] HIGH-SPEED STABILIZATION OF MOLDED PARTS

[76] Inventor: Ralph J. Cafarelli, 228 Stone St., Clinton, Mass. 01510

[21] Appl. No.: 97,495

[22] Filed: Nov. 26, 1979

[51] Int. Cl.³ .............................................. B29C 25/00
[52] U.S. Cl. ................................... 134/105; 134/126; 134/133; 264/348; 425/445; 425/DIG. 9
[58] Field of Search .................. 425/445, DIG. 9; 264/348; 134/124, 133, 134, 126, 105

[56] References Cited

U.S. PATENT DOCUMENTS

| | | | |
|---|---|---|---|
| 875,635 | 12/1907 | Thompson | 134/124 |
| 1,754,612 | 4/1930 | Cook | 134/134 |
| 2,385,860 | 10/1945 | Jesson | 134/124 |
| 2,538,242 | 1/1951 | Hannon | 134/75 |
| 2,618,284 | 11/1952 | Purnell | 134/133 |
| 3,164,656 | 1/1965 | Ipsen | 134/133 |
| 3,673,289 | 6/1972 | Gagliani | 264/348 |

Primary Examiner—James H. Derrington
Attorney, Agent, or Firm—George E. Kersey

[57] ABSTRACT

Method and apparatus for the high-speed stabilization of molded parts. Stabilization is achieved for parts ejected from a molding machine by bringing about a rapid change in the surface temperature of the parts during the course of their conveyance from the molding site. The result is skin-effect hardening which gives dimensional stability to the parts, allowing them to be conveyed away rapidly for further processing. This permits early ejection of parts from the molding machine and enhances production capacity.

14 Claims, 7 Drawing Figures

HIGH-SPEED STABILIZATION OF MOLDED PARTS

BACKGROUND OF THE INVENTION

This invention relates to the stabilization of molded parts, by fixing their dimensions and external configurations, and more particularly, to the high speed stabilization of such parts to enhance production capacity.

In the production of molded parts, molten material is forced into the cavity of a mold through openings called sprues and channels called runners. When the mold is opened, the desired or production product is expelled, along with a by-product formed in the sprue and runner channels. The latter is waste material which must be segregated from the production parts. This can be done manually but that is time consuming and inefficient.

Since the parts, both production and by-product, are produced from molten material, they initially are in an elevated temperature condition.

If the parts are expelled immediately, their dimensions and configurations can change significantly during cooling. When attempts are made to accelerate the cooling, the result often is shrinkage of the parts and loss of dimensional stability. In one attempt to achieve dimensional stability, i.e. reduce the changes that take place in the dimensions of the molded parts during cooling, the parts are allowed to cool partially in the mold before being expelled. The presence of the mold helps constrain the parts during cooling, but this procedure has the disadvantage that the increased residence time of the parts in the mold can seriously reduce the speed with which the parts are produced. In addition, since the parts are not completely cooled before expulsion, they are still subject to dimensional and configuration changes during subsequent cooling.

Even where dimensional and configurational stability are not significant considerations, prompt expulsion of parts from the mold requires that they be allowed to cool on an appropriate surface before they are subjected to further processing. This interferes with the molding operation and the rapid and efficient production of parts. There is either a production delay or a long conveyor must be used so that the parts will cool sufficiently before the next step in processing. Another technique has been to use a short conveyor with cooling fans but this technique has proved inadequate because it has been incapable of imparting sufficiently uniform cooling to the expelled parts.

Moreover, some molded materials require not only stabilization, but also conditioning. An example is nylon which can be too brittle for further processing unless its moisture content is at the right level.

Accordingly, it is an object of the invention to facilitate the production of molded parts. A related object is to facilitate the conditioning and stabilization of molded parts, particularly at high production rates. Another related object is to facilitate the handling of parts expelled from a mold in a relatively uniform and consistent manner.

Another object of the invention is to facilitate the cooling of molded parts, particularly at high production rates. A related object is to eliminate the shrinkage of parts and the need for in-mold cooling and its attendant reduction in the number of useful parts that can be produced in a given period of time. Another related object is to stabilize molded parts beyond the level attainable with in-mold cooling.

A further object of the invention is to eliminate the use of long conveyors in attempting to achieve high-speed stabilization of molded parts. A related object is to achieve stabilization beyond that achievable using long cooling conveyors.

A still further object of the invention is to eliminate the use of cooling fans with conveyors in attempting to achieve high-speed stabilization of molded parts. A related object is to achieve stabilization beyond that achievable with fan cooled conveyors.

Still another object of the invention is to achieve suitable segregation of production and by-product parts in a relatively rapid molding cycle. A related object is to permit the handling of parts expelled from a mold at a high mold operation rate.

SUMMARY OF THE INVENTION

In accomplishing the foregoing and related objects, the invention provides for the high-speed stabilization of molded parts by promptly expelling them from a mold and subjecting them to a rapid change in surface temperature to produce skin effect hardening during conveyance of the parts from a molding site. This tends to fix or stabilize the outer configuration of the parts, so that they do not change significantly in shape during subsequent processing. The parts are then subjected to relatively uniform cooling during conveyance to a site for separation of production from by-product parts.

In accordance with one aspect of the invention the temperature change is achieved on a comparatively uniform basis from the high level associated with the expulsion of parts from a mold to a lower level which is suitable for the separation of production and by-product parts.

In accordance with still another aspect of the invention, the temperature control medium, for example water, is maintained at a comparatively uniform temperature, despite the heat of the ejected parts, by the use of a special heat transfer arrangement.

In accordance with yet another aspect of the invention, a conveyor is used with a temperature control bath so that the bottom portion of the conveyor sits in the bath over a prescribed length to achieve the desired cooling. Thereafter the conveyor changes its contour to facilitate the transport of the by-product and production parts to a site for separation.

In accordance with yet a further aspect of the invention, the entry of the expelled parts into the bath is promoted, even where the parts have a specific gravity which is similar or lower than that of the bath. This is accomplished by treatment of the bath, mechanically and/or chemically. The mechanical treatment causes agitation of the bath, for example, by movement of cleats in the bath which eliminates isothermal layers. The chemical treatment can make use of a diluant to facilitate the wetting of the parts and their entry into the bath. The residence of the parts in the bath can be used also to bring about the desired conditioning of their materials.

In accordance with still a further aspect of the invention, agitation of the bath also can be produced by a bubbling gas through the bath, or by auxiliary mechanical agitation above or in the bath. The effect of agitation is also achievable by the use of a wetting agent which reduces the buoyancy of the parts.

In accordance with other aspects of the invention, the bath includes hold-down rails to maintain a desired portion of the conveyor in the bath in accordance with the desired residence time. In addition an auxiliary conveyor may be positioned above the bath conveyor to further control the movement of parts in the bath.

DESCRIPTION OF THE DRAWINGS

Other aspects of the invention will become apparent after considering several illustrative embodiments taken in conjunction with the drawings in which.

DETAILED DESCRIPTION

Figure 1:
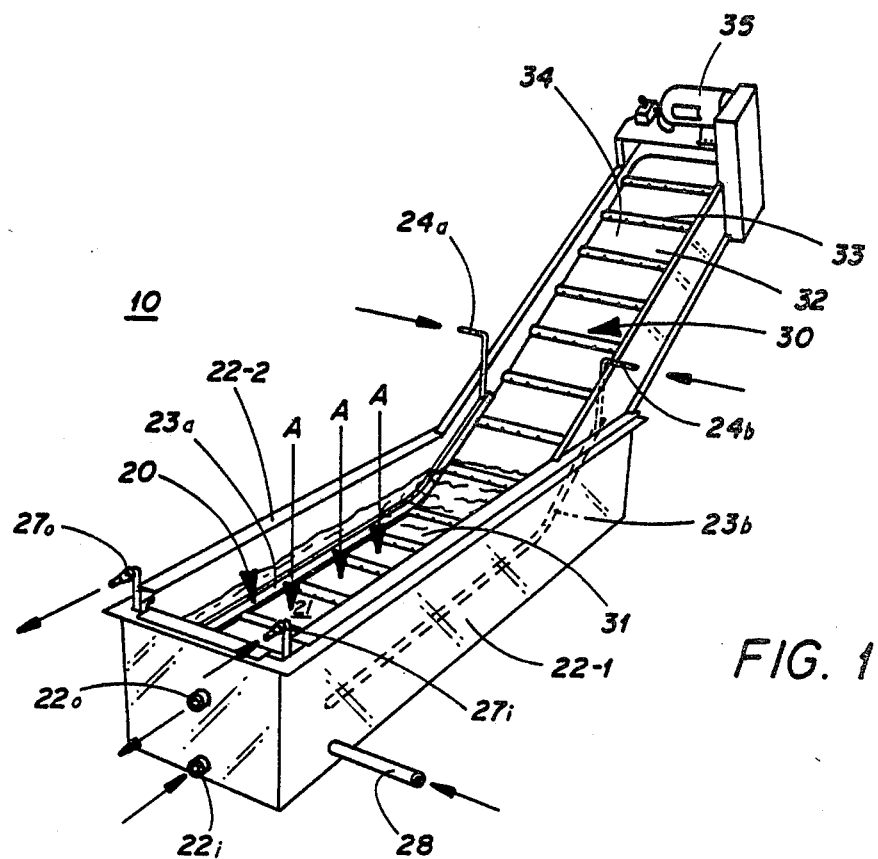
FIG. 1 is a perspective view of a partial system in accordance with the invention.

With reference to the drawings, a system 10 in accordance with the invention is shown in FIG. 1 with a temperature control unit 20 and a specially configured conveyor 30. The latter is in two portions 31 and 32 with the lower portion 31 generally within the unit 20 and the upper portion 32 extending outwardly from the unit 20 at a suitable angle to allow the conveyance of parts cooled in the unit 20 for further processing, such as the separation of production and by-product parts.

The parts that enter the unit 20 are deposited in the direction indicated by the arrows A and typically represent production and by-product parts that have been expelled from a molding machine (not shown) positioned above the unit 20. When the mold of such a machine is opened, parts are expelled and fall by gravity into the unit 20. It will be appreciated that parts may enter the unit 20 in a wide variety of other ways.

The unit 20 of FIG. 1 illustratively includes a temperature controlled fluid medium 21 in a two-part tank 22-1 and 22-2. A suitable temperature controlled medium 21 is water which can be fed into the tank 22 at an inlet 22a. It will be appreciated that other temperature controlled media may be employed as well, and that they can be applied to the unit 20 in a wide variety of ways.

A tank with separate parts 22-1 and 22-2 is employed in order to prevent leakage at the bearings of the conveyor 30. Ordinarily the shafts associated with the conveyor 30 would extend through the side walls of the tank. This could produce leakage from the tank at the mountings. The invention eliminates this possibility by using two tanks, an outer tank 22-1 and an inner tank 22-2. The mountings of the conveyor shafts covered by the medium 21 are on the inner tank 22-2 which is set into the outer tank 22-1. Any leakage from the inner tank 22-2 simply combines with that portion of the medium 21 in the outer tank 22-1.

Since the lower portion 31 of the conveyor is immersed in the medium 21, hold-down rails 23a and 23b, are affixed to respective side walls of the inner tank 22-2 to control the extent of the conveyor portion 31 in the medium 21.

Figure 3:
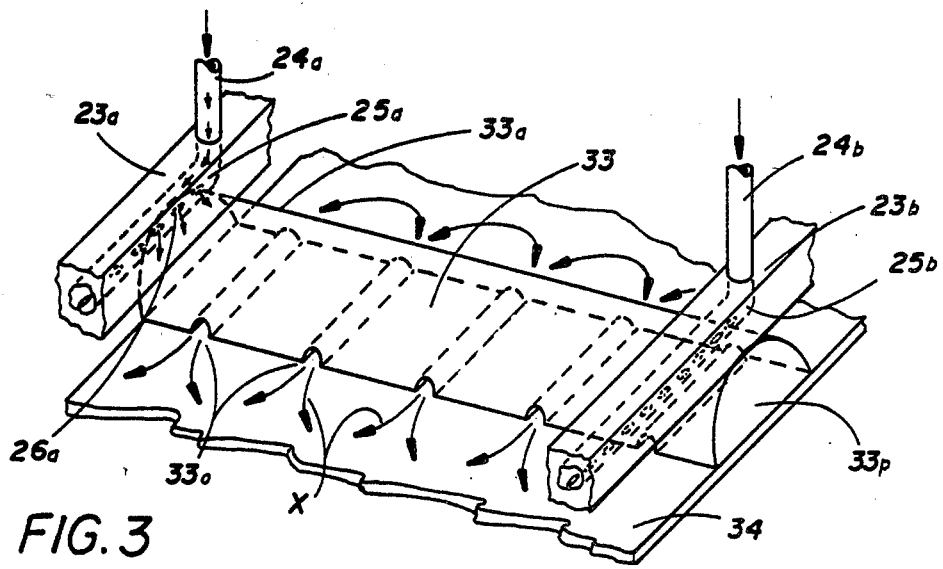
FIG. 3 is a perspective view showing details of the hold-down and cleat arrangement for the system of FIGS. 1 and 2.

In addition, the cleats 33, one of which is shown in detail in FIG. 3, are configured to facilitate the movement of the conveyor with respect to the hold-down rails 23a and 23b. For that purpose the cleats 33 have a surface which desirably maintains tangential contact with the lower surfaces of the rails 23a and 23b. As shown in FIG. 3 a suitable cross sectional profile of the cleat 33 is provided by a parabola 33p.

Also, provision is advantageously made to promote the movement of the cleats with respect to the rails 23a and 23b over that region which is not immersed in the medium 21. This is the region between the ends of the rails 23a and 23b of the inclined portion of the conveyor 23 and the exit of the conveyor from the unit 20. Additional lubrication is provided by lines 24a and 24b which apply a suitable material to the respective rails 23a and 23b. For that purpose the lines 24a and 24b are connected to internal channels 25a and 25b which have outlet apertures 26a and 26b at the contact points of the cleats 33 as shown in FIG. 3.

It is desirable for the material applied at the lines 24a and 24b not only to provide lubrication but also serve as a wetting agent for the medium in the unit 20. The wetting agent is desirable to facilitate the immersion of buoyant parts into the bath. A suitable lubricating and wetting agent is a non-ionic surface active substance, for example, a nonyl phenol ethylene oxide adduct. One such adduct is sold and marketed under the name "IGEPAL" CO-800 by G.A.F. (General Aniline and Film Co.). It will be appreciated that the medium 21, e.g. water, may be applied to the tanks 22-1 and 22-2 by the lines 24a and 24b.

In addition, movement of the cleats 33 relative to the hold-down rails 23a and 23b is promoted by the use of suitable plastic materials such as solid linear polyethylene. The belt 34 shown in FIG. 3, is advantageously of low shrink polyvinylcloride which is substantially unaffected by its immersion in the unit 20.

Figure 2:
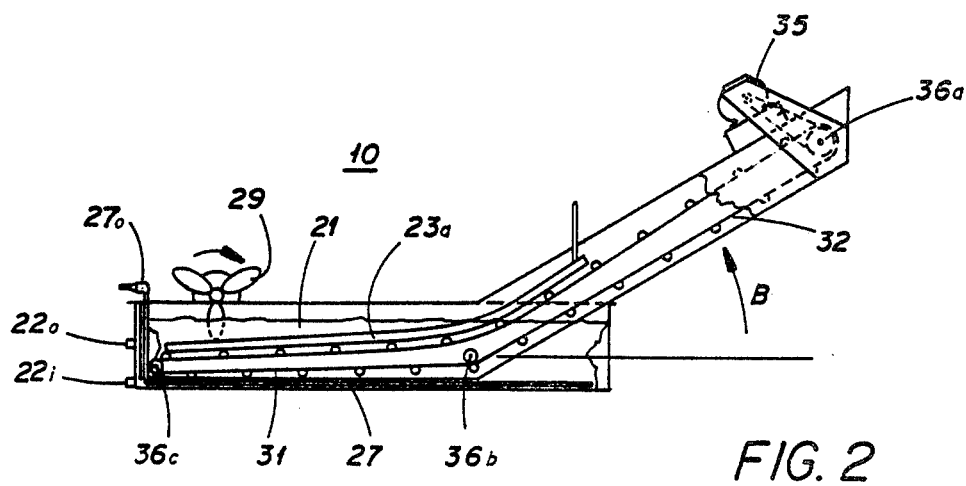
FIG. 2 is a cross sectional view showing conveyor details of the system of FIG. 1.

The system 10 is operated by a drive motor 35 positioned above the discharge end of the inclined conveyor portion 32 as shown in detail in FIG. 2. The motor 35 operates a drive roll 36a of the conveyor, which is also provided with an idling roll 36b and an end roll 36c. As noted previously the idling roll 36b and the end roll 36c are mounted in the walls of the inner tank 22-2 to prevent leakage of the medium 21. The drive roll 36a is desirably of hollow construction to permit drainage of any fluid carried out of the bath to the upper portion of the conveyor. The idler roll 36b is positioned within the tank 22 at a break point between transitions from the inclined portion of the conveyor 35 to the straight line portion of the conveyor 31. The illustrated angle of inclination of the portion of the conveyor extending out of the bath is illustratively 30 degrees as indicated by the arc B in FIG. 2. Acceptable ranges of elevation for the inclined portion of the conveyor 30 desirably range between 5 degrees and 65 degrees.

Figure 4:
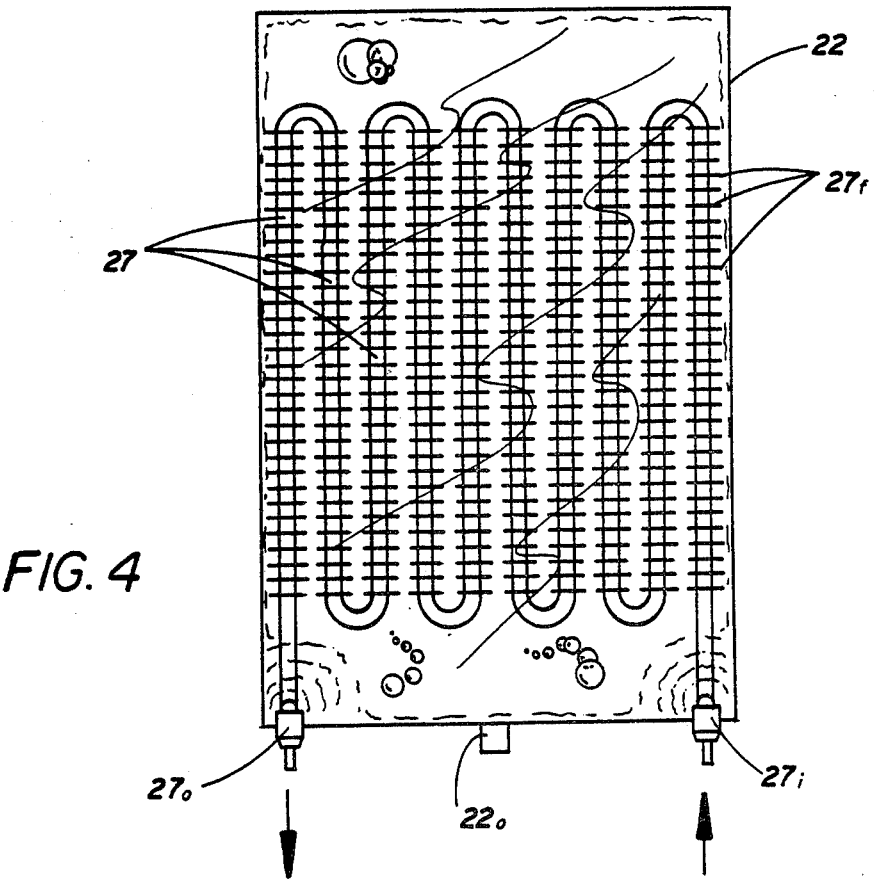
FIG. 4 is a plan view of the bath portion of the system of FIGS. 1 and 2 showing a cooling arrangement for maintaining a relatively uniform temperature in the cooling bath.

As the parts ejected from the mold into the unit 20 enter the medium 21, they transfer their heat to the body mass of the medium. In general operation, after a relatively small number of cycles, the temperature of the medium 21 would soon approach that of the parts. In order to facilitate the maintaining of the temperature of the medium 21 at a suitable level, the base of the tank 22 includes a serpentine temperature control coil 27 shown in plan view in FIG. 4. A suitable substance, for example, a refrigerant, such as ethylene glycol, is applied at an inlet 27i, at an extension of the coil 27 above the tank 22, as shown in FIGS. 1 and 2. The refrigerant exits from the coil 27 at an outlet 27o which is also above the level of the tank 22. Suitable transfer of heat to the coil 27 is promoted by the use of fins 27f on the coil 27. It will be appreciated that in some cases, the objective will include maintaining the parts relatively warm, in which case a substance such as steam or hot water is used to maintain a desired temperature, e.g. 75° F.

In addition to the use of the coil 27, the maintenance of the bath at a desired temperature level can be promoted by controlling the flow that enters the inlet 22i and leaves the outlet 22o, as indicated in FIG. 1. A pump (not shown) forces the bath fluid into the inlet 22i and the outflow leaves by the outlet 22o. It is desirable to use filters (not shown) in the pump line. Since the transfer of heat causes warm layers of water to be at the top of the tank, the outlet 22o is located near the upper level of the bath while the filling inlet 22i is located near the base of the tank. It is to be noted that when the medium 21 is to be drained from the tank 22, the pump (not shown) at the inlet 22i is disconnected and drainage is allowed to take place at that point.

As the parts that have fallen into the bath and settled on that portion of the conveyor 31 in the tank 22 are carried out of the unit 20, coolant tends to be trapped behind the leading portion of each cleat, e.g. the portion 33a of FIG. 3. The bath coolant that would otherwise be trapped is released by the provision of apertures 33o at the base of the cleat and above the surface of the carrier 34. The flow of the released coolant is indicated by the arrows X.

Figure 5:
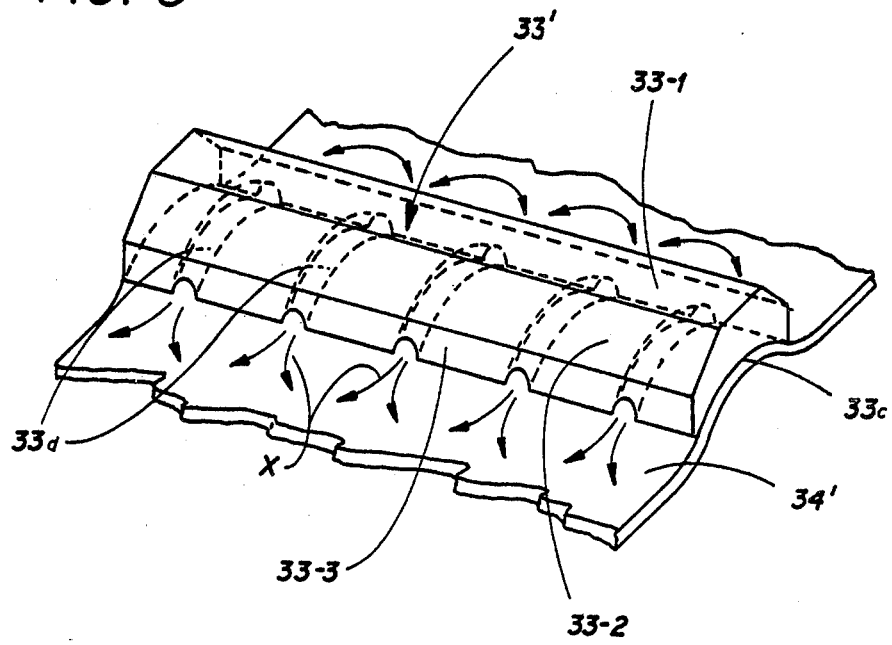
FIG. 5 is perspective view of an alternative cleat and support mounting according to the invention.

An alternative form of cleat 33' is shown in FIG. 5. This cleat has a profile formed by straight line segments, with the segment facing the hold-down rails 23a and 23b being flat. Because the exterior surface of the cleat 33' has straight-line segments, it is easily produced. In addition the cleat 33' has a curved base 33c. This limits the tendency of the base to separate from the carrier as the conveyor changes direction, and thus avoids the inadvertent trapping of parts between the base and the carrier. The drainage ports 33d of the cleat 33' have a curvature that corresponds to that of the base.

As indicated above, the entry of relatively buoyant parts is facilitated by the use of a surface active agent introduced at lines 24a and 24b. The entry of buoyant parts, as well as the immersion conditioning and processing of parts, is also facilitated by other techniques as well, such as the introduction of a gas at inlet 28 (FIG. 1) which bubbles through the unit 20 and produces the desired agitation. Alternative agitation is produced by the propeller 29, shown in FIG. 2, with one of its blades in the unit 20. Rotation of the propeller 29 also produces the desired agitation and facilitates entry of the parts into the bath. It is to be noted that in some cases the agitation produced by the cleat of the conveyor is sufficient to prevent the formation of isothermal layers.

Figure 6:
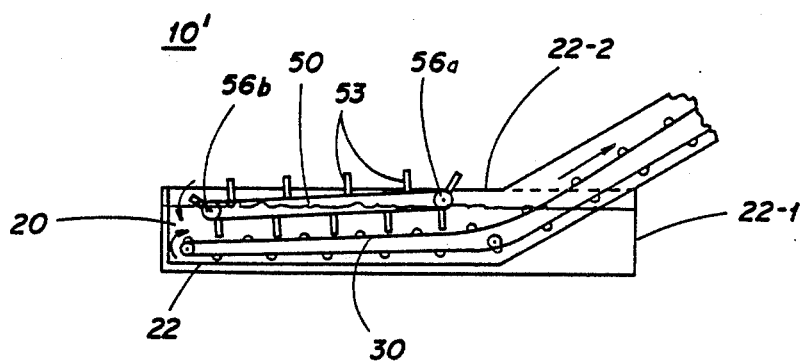
FIG. 6 is a partial side view of an alternative system in accordance with the invention.

Another technique for promoting the immersion of parts is shown in FIG. 6. An auxiliary conveyor 50 with paddles 53 is positioned above the lower portion 31 of the conveyor 30. The conveyor is mounted on rollers 56a and 56b, which are also mounted in the inner tank 22-2 to prevent leakage of any contained fluid. The current produced by the rotation of the conveyors 30 annd 50 carries the parts between them to bring about the desired processing.

Figure 7B:
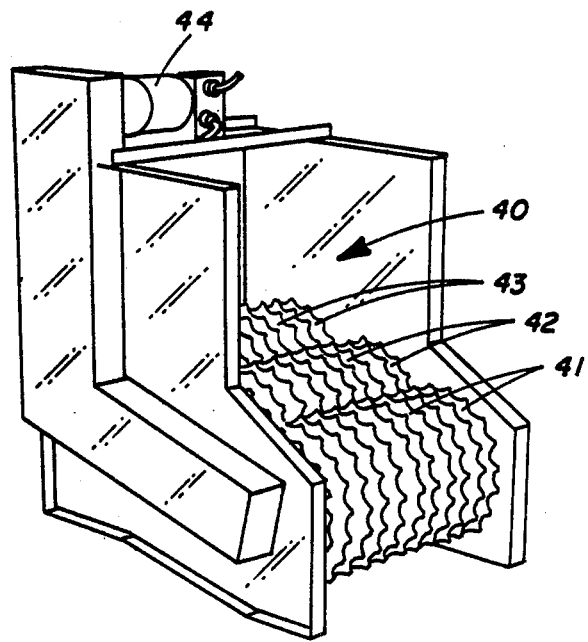
FIG. 7B is a perspective view of the separator shown in FIG. 7A.
Figure 7A:
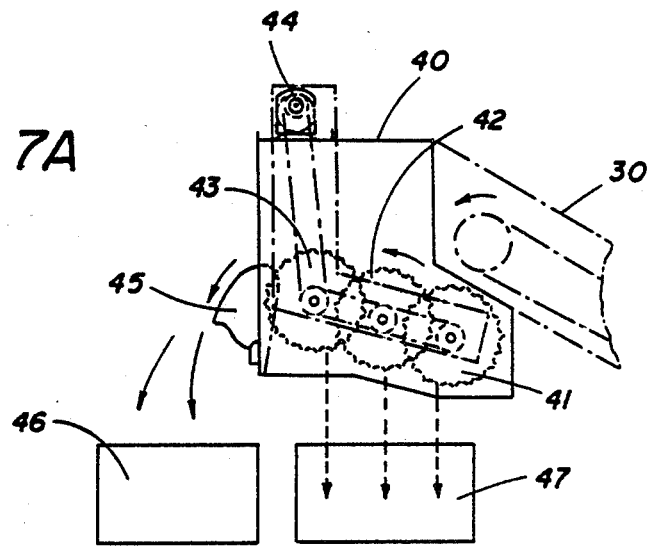
FIG. 7A is a partial side sectional view showing a separator used in the system of FIGS. 1 and 2.

The parts that are carried to the exit position of the conveyor typically include both production and by-product parts. Production parts represent the desired output of the system and are collected and packaged accordingly. The by-product parts are scrap. They are collected for reuse in the molding cycle by granulation, and then melting and injection into the mold. In order to effect the desired separation of the production and by-product parts the invention provides for connection with a separator 40 at the output end of the conveyor 30 as shown in FIG. 7A. Details of the separator are set forth in FIG. 7B.

The separator 40 automatically separates production parts from by-product parts, such as runners, at the discharge end of the conveyor. It is advantageously bolted to the frame of the conveyor 30. The separator 40 contains three sets of intermeshed rotors 41, 42 and 43 which have their hubs mounted at an angle of elevation which is slightly less than the angle of elevation of the inclined portion of the conveyor 30. The rotors 41, 42 and 43 are driven by a motor 44 which directly turns the rotors 43, which in turn drives rotors 41 and 41. The parts of one group fall between the rotors and are collected in a bin 47. The parts of the other group are carried over the tops of the rotors to diverter blades 45 where they are dropped into a bin 46. In the usual case it is the production parts that are carried over the rotors and are collected in the bin 47. However, inverse separation is also possible in which it is the by-product parts that are carried over the rotors and collected in the bin 47.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. An apparatus for the stabilization of molded parts, comprising a coolant bath;

a conveyor positioned partly in and partly out of said bath;

said conveyor forming a closed loop around a first end roll in said bath, an idling roll in said bath between a transition from a straight-line portion of the conveyor to an inclined portion thereof, and a second end roll out of said bath;

and means above said conveyor for holding it in said bath.

2. An apparatus for the stabilization of molded part, comprising a coolant bath;

a conveyor positioned partly in and partly out of said bath;

and a separator positioned at one end of said conveyor;

said separator including a set of rotors which are spaced apart on a hub to permit one set of parts to fall between the rotors and another set of parts to be carried over said rotors.

3. An apparatus as defined in claim 1 further including a separator at the end of the conveyor which is out of the bath.

4. An apparatus as defined in claim 2 further including means for maintaining the temperature of the bath at a prescribed level despite the transfer of heat from the parts to the bath.

5. An apparatus as defined in claim 4 wherein the temperature is maintained by a serpentine cooling coil in said bath.

6. An apparatus as defined in claim 1 or 2 wherein the conveyor is motor driven at the end thereof out of the bath.

7. An apparatus as defined in claim 1 or 2 wherein the conveyor contains slotted cleats in order to facilitate the drainage of the coolant as parts are lifted out of the bath.

8. An apparatus as defined in claim 2 wherein the conveyor is maintained in the bath by hold-down rails which engage the cleats of the conveyor.

9. An apparatus of claim 8 wherein the cleats and hold-down rails are of polyethylene.

10. An apparatus of claim 9 further including means for increasing the wetability of buoyant parts.

11. An apparatus as defined in claim 2 wherein said separator is connnected to the output end of said conveyor.

12. An apparatus as defined in claim 2 wherein said separator included a plurality of sets of rotors, with each set mounted on a separate hub.

13. An apparatus as defined in claim 12 wherein the hubs of said sets of rotors are mounted on an incline.

14. An apparatus as defined in claim 12 or 13 wherein the rotors of each set are interspersed with one another.

* * * * *